United States Patent
Erdl et al.

(10) Patent No.: US 11,060,681 B2
(45) Date of Patent: Jul. 13, 2021

(54) LIGHTING APPARATUS FOR A MOTOR VEHICLE

(71) Applicant: Bayerische Motoren Werke Aktiengesellschaft, Munich (DE)

(72) Inventors: Helmut Erdl, Flintsbach (DE); Abdelmalek Hanafi, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/808,825

(22) Filed: Mar. 4, 2020

(65) Prior Publication Data

US 2020/0200346 A1 Jun. 25, 2020

Related U.S. Application Data

(63) Continuation of application No. PCT/EP2018/076015, filed on Sep. 25, 2018.

(30) Foreign Application Priority Data

Nov. 2, 2017 (DE) ...................... 10 2017 219 502.9

(51) Int. Cl.
  *F21S 41/16* (2018.01)
  *F21S 41/24* (2018.01)
  (Continued)

(52) U.S. Cl.
  CPC ............... *F21S 41/16* (2018.01); *F21S 41/24* (2018.01); *F21S 41/675* (2018.01); *G02B 26/0833* (2013.01)

(58) Field of Classification Search
  CPC .......... F21S 41/16; F21S 41/24; F21S 41/675; G02B 6/0833; B60Q 11/00
  See application file for complete search history.

(56) References Cited

U.S. PATENT DOCUMENTS 5,365,413 A   11/1994   Krammer
5,386,250 A   1/1995    Guerinot
(Continued)

FOREIGN PATENT DOCUMENTS

DE     33 19 179 A1   1/1985
DE     694 25 025 T2   2/2001
(Continued)

OTHER PUBLICATIONS

Non-final U.S. Office Action issued in U.S. Appl. No. 16/808,795 dated Aug. 18, 2020 (12 pages).

(Continued)

*Primary Examiner* — Zheng Song
(74) *Attorney, Agent, or Firm* — Crowell & Moring LLP

(57) ABSTRACT

A lighting device for a motor vehicle has a plurality of laser light sources and an optical channel via which light from the plurality of laser light sources is conducted during the operation of the lighting device, in order to generate light spread from the conducted light in the area around the motor vehicle. The lighting device is characterized in that an optical element, which can be switched by a control device into different switching states, is provided between the plurality of laser light sources and the optical channel, a different switching state being associated with each laser light source. In each respective switching state, only light from the laser light source associated with the respective switching state is fed into the optical channel by way of the optical element. The control device is designed such that, when the light of one of the plurality of laser light sources is fed into the optical channel, the device keeps the other at least one laser light source switched off.

15 Claims, 2 Drawing Sheets

(51) Int. Cl.
   *F21S 41/675*     (2018.01)
   *G02B 26/08*     (2006.01)

(56) References Cited

U.S. PATENT DOCUMENTS

| | | | |
|---|---|---|---|
| 8,256,941 | B2 | 9/2012 | Hikmet et al. |
| 9,441,812 | B2 | 9/2016 | Liao et al. |
| 9,869,443 | B2 | 1/2018 | Kimura |
| 2006/0146552 | A1 | 7/2006 | Shaffer |
| 2006/0274288 | A1 | 12/2006 | Conner |
| 2009/0279316 | A1* | 11/2009 | Hikmet ............... F21S 41/645 362/465 |
| 2011/0216321 | A1 | 9/2011 | Kuratomi |
| 2015/0137680 | A1* | 5/2015 | Komatsu ............. F21S 41/16 315/82 |
| 2015/0160454 | A1* | 6/2015 | Bhakta ............... F21S 41/151 362/513 |
| 2016/0195232 | A1* | 7/2016 | Boinet ............... F21S 41/663 362/510 |
| 2016/0245471 | A1* | 8/2016 | Nakazato ............ F21S 41/16 |
| 2016/0377252 | A1 | 12/2016 | Bhakta |
| 2017/0097134 | A1* | 4/2017 | Akisada ............ B60Q 11/002 |
| 2017/0175968 | A1* | 6/2017 | Shimizu ............ G03H 1/0248 |
| 2017/0282785 | A1 | 10/2017 | Albou et al. |
| 2017/0282786 | A1* | 10/2017 | Toda ............... F21S 41/39 |
| 2017/0334341 | A1* | 11/2017 | Kurashige ............ B60Q 1/24 |
| 2017/0350570 | A1 | 12/2017 | Schwaiger et al. |
| 2018/0356062 | A1* | 12/2018 | Mayer ............... F21S 41/36 |
| 2019/0011107 | A1* | 1/2019 | Mitterlehner ......... B60Q 1/14 |
| 2020/0032976 | A1 | 1/2020 | Shimada |
| 2020/0182425 | A1* | 6/2020 | Mouri ............... F21S 41/675 |
| 2020/0238892 | A1* | 7/2020 | Maruyama .......... F21S 41/10 |

FOREIGN PATENT DOCUMENTS

| | | |
|---|---|---|
| DE | 10 2006 045 692 A1 | 4/2008 |
| DE | 10 2013 221 067 A1 | 5/2015 |
| DE | 10 2016 200 590 A1 | 7/2017 |
| EP | 1 489 854 A2 | 12/2004 |
| EP | 2 955 428 A1 | 12/2015 |
| EP | 3 124 852 A1 | 2/2017 |
| EP | 3 133 336 A1 | 2/2017 |
| GB | 2474460 A | 4/2011 |
| JP | 2004-133312 A | 4/2004 |
| JP | 2004-302357 A | 10/2004 |
| JP | 2015-174551 A | 10/2015 |
| WO | WO 2008/109024 A1 | 9/2008 |
| WO | WO 2010/020930 A1 | 2/2010 |
| WO | WO 2013/099144 A1 | 7/2013 |
| WO | WO 2015/033764 A1 | 3/2015 |

OTHER PUBLICATIONS

English translation of document B1 (WO 2013/099144 A1 previously filed on Mar. 4, 2020) (24 pages).
International Search Report (PCT/ISA/210) issued in PCT Application No. PCT/EP2018/076016 dated Jan. 16, 2019 with English translation (six (6) pages).
German-language Written Opinion (PCT/ISA/237) issued in PCT Application No. PCT/EP2018/076016 dated Jan. 16, 2019 (six (6) pages).
German-language Search Report issued in German Application No. 10 2017 219 504.5 dated Oct. 9, 2018 with partial English translation (13 pages).
International Search Report (PCT/ISA/210) issued in PCT Application No. PCT/EP2018/076015 dated Jan. 31, 2019 with English translation (six (6) pages).
German-language Written Opinion (PCT/ISA/237) issued in PCT Application No. PCT/EP2018/076015 dated Jan. 31, 2019 (seven (7) pages).
German-language Search Report issued in German Application No. 10 2017 219 502.9 dated Feb. 21, 2018 with partial English translation (13 pages).

* cited by examiner

LIGHTING APPARATUS FOR A MOTOR VEHICLE

CROSS REFERENCE TO RELATED APPLICATIONS

This application is a continuation of PCT International Application No. PCT/EP2018/076015, filed Sep. 25, 2018, which claims priority under 35 U.S.C. § 119 from German Patent Application No. 10 2017 219 502.9, filed Nov. 2, 2017, the entire disclosures of which are herein expressly incorporated by reference.

BACKGROUND AND SUMMARY OF THE INVENTION

The invention relates to a lighting apparatus for a motor vehicle and to a corresponding motor vehicle.

Increasingly, laser light sources that allow the generation of light distributions in the exterior space of the motor vehicle with a very high brightness are used nowadays in lighting apparatuses for motor vehicles. For example, lighting apparatuses having laser light sources are used to produce high beam (e.g. glare-free high beam) and low beam. Frequently, a plurality of laser light sources are operated at the same time in motor vehicle lighting devices, which allows the generation of very bright light distributions but limits the design freedom when arranging the laser light sources in the lighting apparatus, which means that available installation space is frequently not used efficiently.

It is the object of the invention to create a lighting apparatus for a motor vehicle that uses a plurality of laser light sources and at the same time has a simple and compact design.

This object is achieved by the lighting apparatus according to the claimed invention.

The lighting apparatus according to the invention is intended for a motor vehicle, such as a people carrier and possibly also a truck. The lighting apparatus can represent for example a front headlight and/or a tail light or parts thereof. The lighting apparatus comprises a plurality of laser light sources and an optical channel via which light from the plurality of laser light sources is guided during the operation of the lighting apparatus to generate from the guided light a light distribution in the exterior space of the motor vehicle. The light is preferably guided via the optical channel to an optical unit (also referred to as a secondary optical unit), which generates the light distribution in the exterior space of the motor vehicle. The secondary optical unit in this respect is a constituent part of the optical channel and can have a different design, for example as a reflection and/or projection optical unit. Depending on the embodiment, the lighting apparatus can realize different light functions in the motor vehicle, with preferred variants of such light functions being mentioned further below.

Where interactions between the lighting apparatus and the motor vehicle or components of the motor vehicle are described below and in particular in the claims, this should always be interpreted to mean that the interaction occurs with the arrangement or installation of the lighting apparatus in the motor vehicle. Consequently, the components of the lighting apparatus that exhibit a corresponding interaction with the motor vehicle or the components of the motor vehicle are configured such that the interaction is brought about upon arrangement or installation of the lighting apparatus in the motor vehicle.

The lighting apparatus according to the invention is characterized in that an optical element, which is switchable into different switching states by way of a control device, is provided between the plurality of laser light sources and the optical channel. Each laser light source is assigned here a separate (that is to say different) switching state, and in a respective switching state the light is injected, using the optical element, into the optical channel from only the laser light source that is assigned the respective switching state. The control device is furthermore configured such that, when injecting the light of one of the plurality of laser light sources into the optical channel, it keeps the other laser light source or sources in the switched-off state. The lighting apparatus according to the invention may also possibly contain multiples of the combination just described of an optical channel, an optical element and a plurality of laser light sources.

The lighting apparatus according to the invention has the advantage that, by using an optical element in the manner of an optical switch, the light from the laser light sources is no longer injected into the optical channel at the same time, which increases the flexibility of the arrangement of the laser light sources in the motor vehicle, as a result of which available installation space can be used more efficiently.

In a particularly preferred embodiment of the lighting apparatus according to the invention, at least some of the laser light sources and in particular all of the laser light sources of the plurality of laser light sources comprise an individual laser diode, as a result of which the laser light sources can be realized in the form of highly compact components.

In a further preferred configuration, the laser light sources produce monochromatic light, which has the same wavelength for all laser light sources or which has a different light source for at least one pair of two laser light sources (that is to say the two laser light sources of the pair produce light having different wavelengths). The wavelength for all laser light sources may differ. In one variant, the plurality of laser light sources comprises a red laser light source, a green laser light source, and a blue laser light source. By switching between the laser light sources in a manner which is correspondingly fast and not perceivable by the human eye, white light can be generated using the lighting apparatus.

In a further preferred embodiment, the control device is configured such that it switches cyclically between the different switching states of the optical element, with the result that in one cycle, the light of each laser light source is injected at least once into the optical channel. The repetition frequency of the cycles is preferably between 50 Hz and 2000 Hz, in particular between 500 Hz and 2000 Hz. At such repetition frequencies, switching between laser light sources of different color is no longer perceivable by the human eye, meaning that different color mixtures can be produced, for example the white light already mentioned above.

In a further preferred variant, the lighting apparatus is configured such that a respective laser light source in the switched-on state is operated at a power of between 2 W and 6 W. The power can here be set to be significantly higher than in the case of conventional lighting apparatuses, because at any time, only one individual laser light source is in the switched-on state, which means that the other laser light sources can cool without overheating.

In a further preferred configuration, the optical element comprises a movable and in particular tiltable mirror, which can be moved into different switching positions corresponding to the switching states by being controlled using the control device. Such mirrors are known per se from the prior art. The mirror is preferably realized here in the form of a micro-component, having a maximum extent in plan view on the mirror of 2 mm and less.

In a further embodiment, the optical element comprises a component having a variable refractive index, wherein the refractive index can be changed using the control device by varying a voltage that is supplied to the component and the different switching states are brought about by changing the refractive index. Such components are known per se from the prior art and can also be realized as micro-components having very small dimensions in the region of a few millimeters. In particular, the element having a variable refractive index can comprise an LCoS component (LCoS=liquid crystal on silicon).

In a particularly preferred embodiment, the optical element is what is known as a MEMS component (MEMS=microelectromechanical system). This is a highly compact electronic component, the functionality of which is realized on an individual semiconductor chip.

In a further preferred embodiment, the optical channel comprises a light guide and in particular an individual optical fiber, wherein light coming from the respective laser light source is guided in the light guide. The diameter of the light guide is preferably between 50 μm and 200 μm.

In a further variant, the lighting apparatus comprises one or more conversion elements in the beam path downstream of the optical element in order to convert the light of at least some of the laser light sources from one wavelength range into a different wavelength range. Such conversion elements are known per se from the prior art and consist for example of a doped phosphor. Such conversion elements can be used to easily produce a light distribution of a specific color or a white light distribution. For example, a conversion element can be used to convert the light of a blue laser light source into white light.

In a further preferred configuration, the lighting apparatus comprises a light sensor system for capturing the light intensity in the optical channel, for example at the input or the output of the optical channel. The control device is configured here such that it evaluates the captured light intensity.

In a preferred variant of the above embodiment, the control device is configured such that it sets the switching states of the optical element in feedback with the light intensity captured by the light sensor system such that the light intensity in the respective switching state exceeds a predetermined threshold. In this way, suitable readjustment of the optical element during the operation of the lighting apparatus is achieved.

Alternatively or in addition thereto, the control device is configured such that it detects an error if the (absolute value of the) deviation of the light intensity captured by the light sensor system from a specified target light intensity exceeds a predetermined threshold value, wherein the specified target light intensity is preferably dependent on the operating state of the lighting apparatus, in particular on the operating power or current supplied to the plurality of laser light sources. If an error is detected, preferably an error message is output via a user interface in the motor vehicle and/or an error is logged in an error memory of the motor vehicle. With the embodiment just described, monitoring of the operation of the lighting apparatus is achieved.

In a further variant, the lighting apparatus according to the invention is intended for generating light in the range that is visible to the human eye. The optical channel is preferably set up here to produce, as the light distribution, at least a portion of a low beam and/or high beam and/or blinking light and/or daytime running light and/or a turn signal light and/or side light and/or tail light and/or brake light. Alternatively or in addition thereto, the lighting apparatus can also serve for generating a symbol in the vicinity of the motor vehicle, for example on the ground in the vicinity of the motor vehicle. The term symbol should here be understood to have a broad meaning and can comprise any symbols or characters, such as pictograms.

In a further configuration, the lighting apparatus according to the invention is intended for generating light in the range that is not visible for the human eye, for example light in the infrared range. Said light is preferably used for one or more driver assistance functions in the motor vehicle, for example to ascertain the distance from other road users using time-of-flight measurement of the light. In particular, the lighting apparatus can here be a constituent part of a lidar sensor.

Moreover, the invention relates to a motor vehicle, wherein the motor vehicle comprises one or more of the lighting apparatuses according to the invention or one or more preferred variants of the lighting apparatus according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
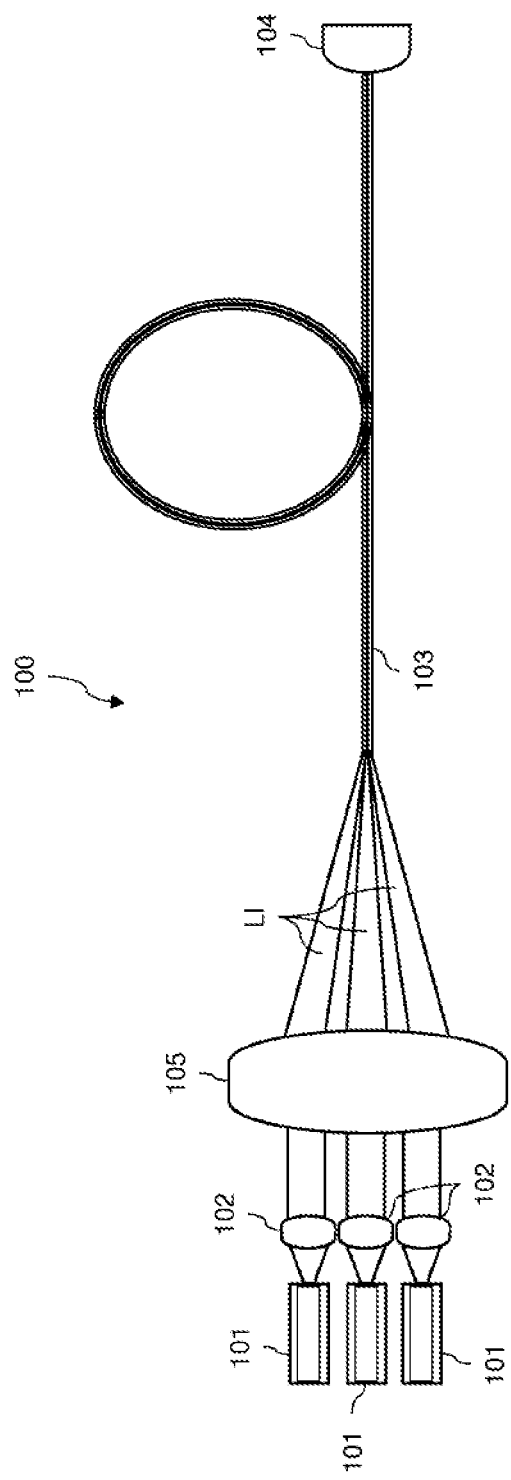
FIG. 1 is a schematic illustration of a motor vehicle lighting apparatus according to the prior art.

The schematic illustration in FIG. 1 shows a motor vehicle lighting apparatus 100 according to the prior art. In this lighting apparatus, a total of three laser light sources are used to produce a plurality of light functions, in particular low beam and high beam, wherein a respective laser light source consists of a laser diode 101 and an attachment optical unit 102. The laser diodes are a red, green and blue laser diode. The light beams LI produced with said laser light sources are injected, using a lens 105, into an optical fiber 103, which transfers said light to a schematically indicated secondary optical unit 104, which projects the light onto the road.

The light mixing of the three laser diodes of different colors gives a light distribution in the form of white light. By using a plurality of laser diodes, it is possible here to generate a very bright light distribution, but a large installation space is required owing to the simultaneous injection of the light of the laser diodes into the optical fiber. The lighting apparatus according to the invention permits a reduction of this installation space owing to the use of an optical element that is switchable into different switching states, as will be explained below with reference to the embodiment of FIG. 2.

Figure 2:
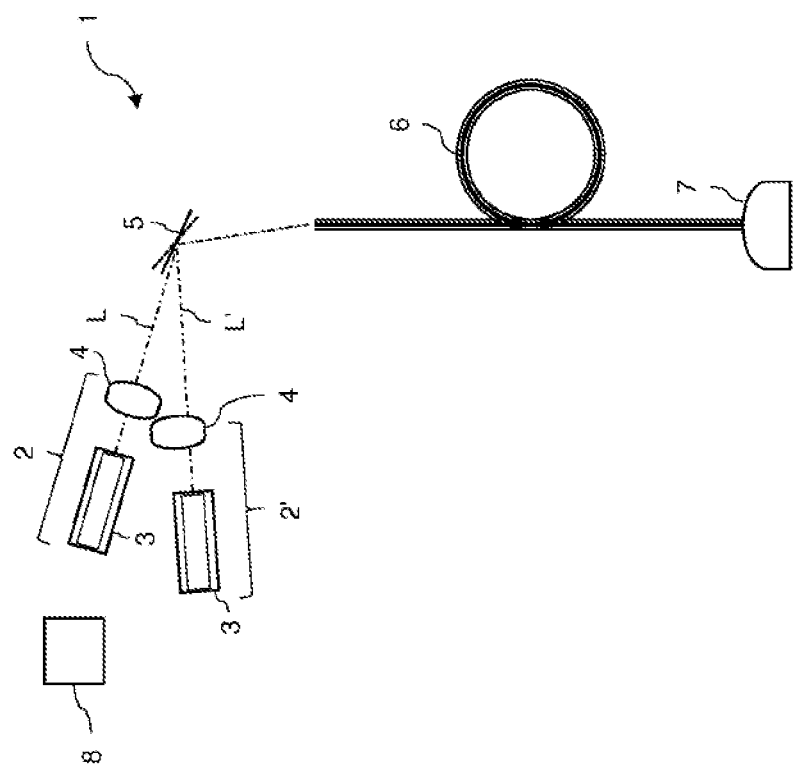
FIG. 2 is a schematic illustration of an embodiment of a lighting apparatus according to the invention.

The lighting apparatus 1 of FIG. 2 comprises two laser light sources 2 and 2', which emit light beams L and L'. It may also be possible for more than two laser light sources to be provided. Analogously to FIG. 1, each laser light source contains a laser diode 3 having an assigned attachment optical unit 4 to produce monochromatic light, for example of a blue color. Moreover, an optical fiber 6, which leads to a secondary optical unit 7, is also provided to generate a specified light distribution. The combination of optical fiber and secondary optical unit represents an embodiment of an optical channel within the meaning of the claims.

If the lighting apparatus 1 is intended to be used to produce white light, a conversion element can be provided, which is arranged for example at the light entrance into the optical fiber 6, as a result of which the monochromatic light of the laser light sources is converted into white light. Nevertheless, it may be also possible using the lighting apparatus 1 to produce colored light, for example blinking light or tail light, wherein in this case yellow or red laser diodes are used without the interposition of a conversion element. It is likewise possible for the laser diodes to emit light in the non-visible range, for example infrared light, to use this light for driver assistance functions, such as for example distance measurement. In particular, the lighting apparatus can here be a constituent part of a lidar sensor.

Rather than directing the light of the laser light sources 2, 2' simultaneously onto a lens, an optical element 5 is used, which is realized as a highly compact MEMS component in the embodiment of FIG. 2 and comprises in the exemplary embodiment shown a tiltable mirror. The mirror can be tilted in this case into two positions, indicated by a solid line and a dashed line. The two positions represent different switching states or switching positions of the mirror 5. In one switching state, only the light L from the laser light source 2 passes in this case into the optical fiber 6, whereas in the other switching positions, only the light L' from the laser light source 2' is injected into the optical fiber 6.

The lighting apparatus 1 of FIG. 2 furthermore comprises a control device 8, which controls both the switching of the mirror 5 into the two switching positions and the switching on and off of the laser diodes 3. The control device 8 here effects cyclic switching on and off of the two laser diodes 3, wherein one laser diode and the other laser diode are switched on in one cycle, and at the same time it is ensured that only one of the laser diodes is switched on at a time. In other words, when one laser diode is switched on, the switching-off of the other laser diode is effected and ensured. The switching on and off of the laser diodes 3 is synchronized using the control device 8 by switching the mirror 5, specifically in a manner such that the laser light of the switched-on laser light source is injected into the optical fiber 6 owing to a corresponding setting of the switching position.

The combination of a switchable optical element with a plurality of laser light sources offers considerably greater flexibility when arranging the laser light sources in the lighting apparatus, which can reduce installation space. The dimension of the mirror 5 realized in the form of a MEMS component is here significantly smaller than the size of the lens 105 used in FIG. 1. In order to achieve the same power outputs with the lighting apparatus of FIG. 2 as with the lighting apparatus of FIG. 1, the individual laser diodes are operated at a higher power. This is possible because the individual laser diodes are only ever switched on temporarily, which allows sufficient time for them to cool. By contrast, the laser diodes of FIG. 1 can only be operated at reduced power, because no phases for cooling are available due to the parallel operation thereof.

The embodiment described above has been explained on the basis of an optical element in the form of a mirror that is tiltable into different switching positions. Nevertheless, the optical element may also be realized in a different form. What is crucial is just that a different deflection of light beams into the different switching positions is effected. For example, the optical element can also be configured as an element having a variable refractive index, wherein the refractive index is variable by way of the voltage supply. In this case, the voltage supply is varied using the control device such that the refractive index is always set such that only the light of the currently switched-on laser light source is injected into the optical fiber in the corresponding switching state.

LIST OF REFERENCES

101 Laser diodes
102 Additional optical units
103 Light guide
104 Secondary optical unit
105 Lens
LI, L, L' Laser light
100 Lighting apparatus
100 Lighting apparatus
2, 2' Laser light source
3 Laser diode
4 Additional optical unit
5 Optical element
6 Light guide
7 Secondary optical unit
8 Control device The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A lighting apparatus for a motor vehicle, comprising:
   a plurality of laser light sources and an optical channel via which light from the plurality of laser light sources is guided during operation of the lighting apparatus to generate, from the guided light, a light distribution in an exterior space of the motor vehicle;
   an optical element, which is switchable into different switching states by way of a control device, arranged between the plurality of laser light sources and the optical channel, wherein
   the optical element is a MEMS component,
   each laser light source is assigned a separate switching state, and in a respective switching state, light is injected, using the optical element, into the optical channel from only the laser light source that is assigned the respective switching state,
   the control device is configured so as to, when injecting the light of one of the plurality of laser light sources into the optical channel, maintain the other laser light source or sources in the switched-off state,
   the control device is configured so as to switch cyclically between the different switching states of the optical element, with the result that in one cycle, the light of each laser light source is injected at least once into the optical channel,
   a repetition frequency of cycles of the optical element is between 500 Hz and 2000 Hz, and
   the light distribution is a color mixture.

2. The lighting apparatus according to claim 1, wherein at least some of the laser light sources of the plurality of laser light sources comprise an individual laser diode.

3. The lighting apparatus according to claim 2, wherein all of the laser light sources of the plurality of laser light sources comprise an individual laser diode.

4. The lighting apparatus according to claim 1, wherein the laser light sources produce monochromatic light, which has the same wavelength for all laser light sources or which has a different wavelength for at least one pair of two laser light sources.

5. The lighting apparatus according to claim 1, wherein the lighting apparatus is configured such that a respective laser light source in the switched-on state is operated at a power of between 2 Watt and 6 Watt.

6. The lighting apparatus according to claim 1, wherein the optical element comprises a movable mirror, which is movable into different switching positions corresponding to the switching states under control of the control device.

7. The lighting apparatus according to claim 1, wherein the optical element comprises a component having a variable refractive index, wherein the refractive index is changeable using the control device by varying a voltage that is supplied to the component and the different switching states are brought about by changing the refractive index.

8. The lighting apparatus according to claim 1, wherein the optical channel comprises a light guide, and light coming from the respective laser light source is guided in the light guide.

9. The lighting apparatus according to claim 1, wherein the lighting apparatus comprises one or more conversion elements in a beam path downstream of the optical element in order to convert the light of at least some of the laser light sources from one wavelength range into a different wavelength range.

10. The lighting apparatus according to claim 1, wherein the lighting apparatus comprises a light sensor system for capturing the light intensity in the optical channel, wherein the control device is configured such that it evaluates the captured light intensity.

11. The lighting apparatus according to claim 10, wherein the control device is configured so as to set the switching states of the optical element in feedback with the light intensity captured by the light sensor system such that the light intensity in the respective switching state exceeds a predetermined threshold.

12. The lighting apparatus according to claim 11, wherein the control device is configured so as to detect an error if the deviation of the light intensity captured by the light sensor system from a specified target light intensity exceeds a predetermined threshold value, wherein the specified target light intensity is dependent on the operating state of the lighting apparatus.

13. The lighting apparatus according to claim 1, wherein the lighting apparatus generates light in the visible range, the optical channel is set up to generate, as the light distribution, at least a portion of a low beam, a high beam, a blinking light, a daytime running light, a turn signal light, a side light, a tail light, a brake light, and/or a symbol in the vicinity of the motor vehicle.

14. The lighting apparatus according to claim 1, wherein the lighting apparatus generates light in the non-visible range, wherein the light is used for one or more driver assistance functions in the motor vehicle.

15. A motor vehicle, comprising one or more lighting apparatuses according to claim 1.

* * * * *